(12) United States Patent
Tuel, Jr.

(10) Patent No.: US 6,385,659 B1
(45) Date of Patent: May 7, 2002

(54) HANDLING OF ASYNCHRONOUS MESSAGE PACKET IN A MULTI-NODE THREADED COMPUTING ENVIRONMENT

(75) Inventor: William G. Tuel, Jr., Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/136,587

(22) Filed: Aug. 19, 1998

(51) Int. Cl.[7] .............................................. G06F 9/54
(52) U.S. Cl. ...................... 709/313; 710/260; 710/200; 709/318
(58) Field of Search ........................ 709/245, 310–332; 710/200, 105, 260

(56) References Cited

U.S. PATENT DOCUMENTS

| | | | |
|---|---|---|---|
| 5,327,558 A | 7/1994 | Burke et al. ................... | 710/8 |
| 5,357,612 A | 10/1994 | Alaiwan ...................... | 709/216 |
| 5,359,317 A | 10/1994 | Gomez et al. ............. | 340/7.52 |
| 5,404,449 A | 4/1995 | Weber et al. .................. | 710/71 |
| 5,479,598 A | 12/1995 | Feitelson et al. ........... | 345/772 |
| 5,544,051 A | 8/1996 | Senn et al. ..................... | 707/3 |
| 5,557,798 A | 9/1996 | Skeen et al. ................. | 705/35 |
| 5,560,004 A | 9/1996 | Weng et al. ............. | 707/104.1 |
| 6,009,488 A | * 12/1999 | Kavipurapu ................ | 710/105 |
| 6,012,121 A | * 1/2000 | Govindaraju et al. ....... | 710/260 |
| 6,125,399 A | * 9/2000 | Hamilton .................... | 709/245 |

OTHER PUBLICATIONS

IBM Publication: "IBM Parallel Environment for AIX: MPI Programming and Subroutine Reference", Version 2, Release 3, 3rd edition, pp. 151 & 152; pp. 179 & 180 (Aug. 25, 1997).

IBM Publication: "AIX Technical Reference, vol. 1: Base Operating System & Extensions", Version 4, 4th edition, pp. 1–840–1–842; pp. 1–850 & 1–851; pp. 1–875 & 1–876; & p. 1–879 (Oct., 1996).

IBM Publication: "AIX Technical Reference, vol. 2: Base Operating System & Extensions", Version 4, 4th edition, pp. 1–1065–1–1072 & p. 1–1092 (Oct., 1996).

IBM Publication: "IBM Parallel Environment for AIX: MPI Programming and Subroutine Reference", Version 2, Release 2, 2nd edition, pp. 319–325 (Nov., 1996).

W. Richard Stevens, "UNIX Network Programming", Health Systems International, pp. 326–328 & pp. 333–334 (1990).

M. Snir et al., "The communication software and parallel environment of the IBM SP2", IBM Systems Journal, vol. 34, No. 2, pp. 205–215 (1995).

IBM Publication: "AIX Technical Reference, vol. 5: Kernel and Subsystems", Version 4, 4th edition, pp. 1–160–1–161 & pp. 1–158–1–159, (Oct. 1996).

* cited by examiner

*Primary Examiner*—St. John Courtenay, III
(74) *Attorney, Agent, or Firm*—Lawrence D. Cutter, Esq.; Kevin P. Radigan, Esq.; Heslin Rothenberg Farley & Mesitri P.C.

(57) ABSTRACT

Message-passing capability is provided in a computer system with a plurality of asynchronous computing nodes interconnected for transmission of messages between threaded user tasks executing in ones of the computing nodes. A message is received at a receiver computing node employing a threaded message passing interface (MPI), which includes a means by which a user-defined program can be called by an interrupt service thread at the MPI. The user-defined program takes a predefined action in response to the asynchronous arrival of the at least one message packet. For example, the user-defined program might comprise a program to initiate a function to receive the at least one message packet at the receiver's threaded MPI, which may include awaking a waiting thread.

10 Claims, 3 Drawing Sheets

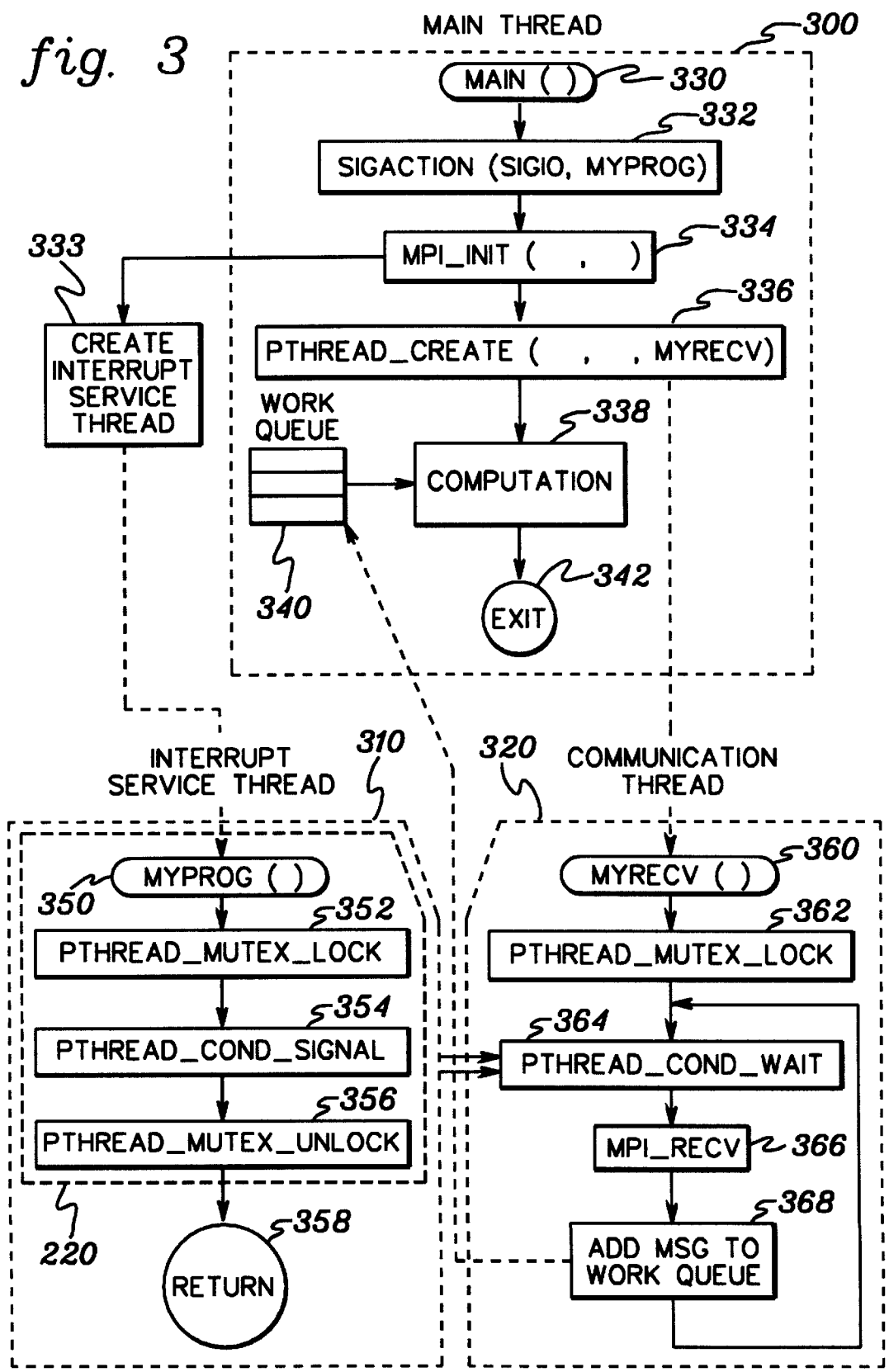

HANDLING OF ASYNCHRONOUS MESSAGE PACKET IN A MULTI-NODE THREADED COMPUTING ENVIRONMENT

CROSS-REFERENCE TO RELATED APPLICATION

This application contains subject matter which is related to the subject matter of the following applications, each of which is assigned to the same assignee as this application and filed on the same day as this application. Each of the below-listed applications is hereby incorporated herein by reference in its entirety:

"METHOD FOR HANDLING OF ASYNCHRONOUS MESSAGE PACKET IN A MULTI-NODE THREADED COMPUTING ENVIRONMENT," by William G. Tuel, Ser. No. 09/136,692; and "SYSTEM FOR HANDLING OF ASYNCHRONOUS MESSAGE PACKET IN A MULTI-NODE THREADED COMPUTING ENVIRONMENT," by William G. Tuel, Ser. No. 09/136,388.

TECHNICAL FIELD

This invention relates to message passing in a computer system with a plurality of asynchronous computing nodes interconnected for transmission of messages between threaded user tasks executing in ones of the computing nodes, and in particular, to a capability for user handling of one or more message packets transmitted from a source computing node (sender) to a receiver computing node (receiver) in a threaded computing environment, wherein the receiver has a threaded message passing interface (MPI).

BCAKGROUND OF THE INVENTION

Technological advances have made it possible to interconnect many processors and memories to build powerful, cost effective computer systems. Distributing computation among the processors allows for increased performance due to improved parallel execution. The performance of a multi-node computing system, however, depends on many factors such as flow control mechanisms, scheduling, the interconnection scheme between the nodes of the system, and the implementation of inter task communication.

A multi-task or parallel application includes multiple user tasks running on multiple nodes of one computer system or multiple computer systems. The user tasks communicate with one another via a message passing interface on the nodes running the user tasks. Specifically, a message packet can be sent within a multi-node computer environment between user tasks executing in ones of the computing nodes. The message packet is transmitted from a source computing node (sender) to a receiver computing node (receiver). Conventionally, user tasks communicate with one another via a message passing mechanism, such as defined by the Message Passing Interface (MPI) Standard. The MPI Standard is described, for example, in message passing interface format materials entitled "MPI: A Message-Passing Interface Standard, Version 1.1," University of Tennessee, Knoxville, Tenn., Jun. 6, 1995, the entirety of which is hereby incorporated herein by reference.

Unfortunately, the MPI Standard provides no mechanism for asynchronous notification of receipt of a message or message packet at a user task, so programmers must devise other ways of receiving notification of events.

In one implementation of the MPI Standard, embodied in the IBM Parallel Environment for AIX (herein referred to as the "signal handling library"), arrival of a message packet at a receiving node may cause a UNIX SIGIO signal to be sent to the receiving process. When a process receives a signal, its normal instruction stream is interrupted, and the first instruction in the registered signal handler is executed. Control remains in the signal handler until it returns. The MPI library registers a signal handler to catch this signal. The MPI-library-supplied signal handler reads the packet into the user's memory, checks it for duplication and valid format, and matches it to its destination. Then it returns, causing the user's program to resume execution at the point of interruption.

Although the MPI library registers a signal handler for SIGIO, it is well-known that the user program may also register a signal handler for the same signal, in which case the user's signal handler gets control when a SIGIO signal is sent to a process. In this way, a user may obtain notification of a message packet arrival by intercepting the SIGIO signal intended for the MPI library.

The development of multi-processor computing nodes has been accompanied by the development of programming models that can exploit these hardware platforms. One such model is a "threads" model, which has recently been standardized by the POSIX Organization. Basic thread management under the POSIX Standard is described, for example, in a publication by K. Robbins and S. Robbins entitled *Practical UNIX Programming—A Guide to Concurrency, Communication and Multi-Threading,* published by Prentice Hall PTR (1996). Briefly described, when a program executes, the CPU uses the process program counter value to determine which instruction to execute next. The resulting stream of instructions is called the "program's thread of execution".

A natural extension of the process model is to allow multiple threads to execute within the same process. This extension provides an efficient way to manage threads of execution that share both code and data by avoiding context switches. Each thread of execution is associated with a "thread," i.e., an abstract data type representing flow of control within a process. A "thread" has its own execution stack, program counter value, register set, and state. By declaring many threads within the confines of a single process, a programmer can achieve parallelism at low overhead.

In an alternative implementation of the MPI Standard, embodied in the IBM Parallel Environment for AIX (herein referred to as "the threaded library"), arrival of a message packet at a receiving node may wake a thread in the receiving process, causing it to resume execution concurrently with other threads comprising the process. This thread is called an "interrupt service thread", and the thread is created when the MPI library is initialized. The interrupt service thread reads the packet into the user's memory, checks it for duplication, and valid format, and matches it to the destination. Then it calls a function provided by the AIX kernel to sleep until the next message packet arrives. However, the user's program has no knowledge of the identity of the interrupt service thread, and hence has no way to obtain notification of packet arrival, or to take action based thereon.

Thus, a need exists in the art for a threaded MPI which allows threaded user tasks to be notified of an external event such as receipt of a message packet, and which allows the user task to take a predefined action in response to asynchronous arrival of the message packet at the receiver.

DISCLOSURE OF THE INVENTION

Briefly summarized, in one aspect an article of manufacture is provided which includes at least one computer useable medium having computer readable program code means embodied therein for causing the processing of a message packet within a computer environment having a plurality of computing nodes interconnected for transmission of messages between threaded user tasks executing asynchronously in ones of the computing-nodes. A message is transmitted as at least one message packet from a source computer node (sender), to a receiver computing node (receiver). The receiver has a threaded messagepassing interface. The computer readable program code means in the article of manufacture includes: computer readable program code means for causing a computer to effect employing an interrupt service thread at the receiver to call a user-defined program in response to asynchronous arrival of the at least one message packet at the receiver; and computer readable program code means for causing a computer to effect employing the user-defined program to take a pre-defined action in response to the asynchronous arrival of the at least one message packet at the receiver.

To restate, a technique for user handling of asynchronous message packets in a multi-node threaded computing environment is provided. The technique involves defining an interrupt service thread in the MPI library and giving it a means to invoke a user-predefined program on arrival of a message packet. The user-predefined program is then employed to take responsive action to the asynchronous arrival of the at least one message packet at the receiver. This action will typically include initiating a receipt function to interpret the message packet at the threaded MPI. Thus, in accordance with the present invention, threaded user tasks are provided with the capability to respond to an asynchronous message arrival without requiring polling or creating additional threads. Further, the user-defined program, which is called by the interrupt service thread in accordance with the present invention, does not have to be signal safe (i.e., a program function which can be called without corrupting other data). One anticipated use is that the user's code will execute thread calls to wake other threads waiting on multiple events. Advantageously, in accordance with the present invention "signal handlers" are reinterpreted for a threaded environment to give a user task the same sort of capability in the threaded environment that the user task would have had in a signal handling environment.

BRIEF DESCRIPTION OF THE DRAWINGS

These and other objects, advantages and features of the present invention will be more readily understood from the following detailed description of certain preferred embodiments of the invention, when considered in conjunction with the accompanying drawings in which:

FIG. 3 depicts one overview example of processing in response to an asynchronous message arrival in a threaded computing environment in accordance with the present invention, wherein processing of a main thread, the interrupt service thread, and a communication thread are shown.

BEST MODE FOR CARRYING OUT THE INVENTION

In accordance with the principles of the present invention, a message packet processing capability is provided that allows threaded user tasks to asynchronously communicate between ones of the computing nodes of a multi-node threaded computer environment. In one embodiment, an interrupt service thread is employed to (for example) wake up a third process thread to take a user-predefined action in response to asynchronous arrival of a message packet at a receiver computing node. Thus, asynchronous message passing capability is provided pursuant to this invention notwithstanding use of a threaded message passing interface (MPI), and without requiring polling which would use computer processor instructions which could more advantageously be used for a user's computation.

Figure 1:
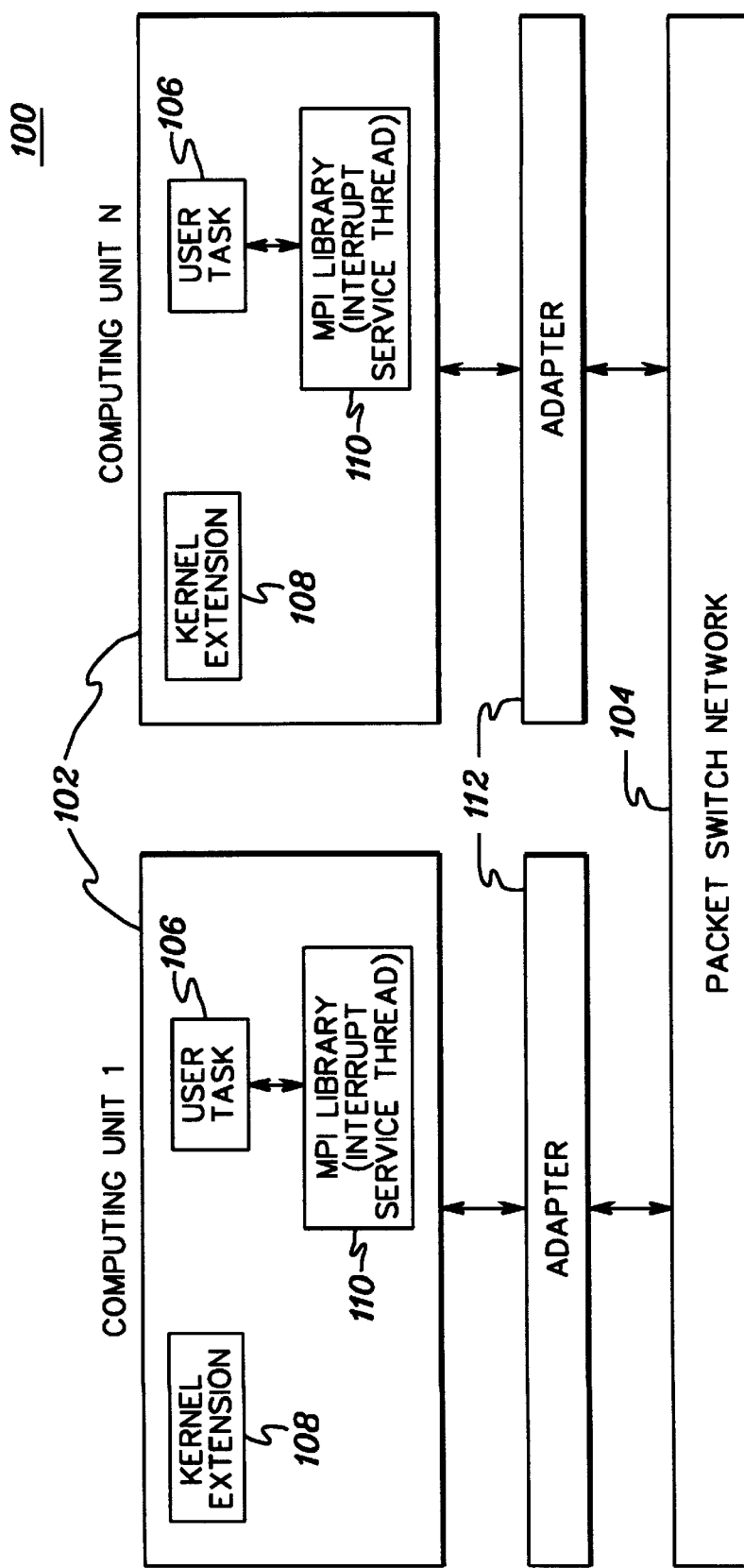
FIG. 1 depicts one example of a threaded computer environment incorporating message packet processing capabilities in accordance with the present invention.

One example of a threaded computer environment incorporating and using the asynchronous message passing capability of the present invention is described below with reference to FIG. 1.

In one embodiment, a computer environment 100 includes a plurality of computing units 102 coupled to one another via a connection 104. In one example, each computing unit is a node of an RS/6000 SP system offered by International Business Machines Corporation, and connection 104 is a packet switch network, such as the SP Switch or High Performance Switch (HPS), also offered by International Business Machines Corporation.

A message packet is passed from a source computing node (sender) to a receiver computing node (receiver) via packet switch network 104. For example, a user task 106 of computing unit N may pass a message to a user task 106 of computing unit 1 (receiver). Each user task can directly read data from and write data to an associated adapter 112, bypassing the overhead normally associated with having the operating system intervene in communication protocols. Adapter 112 couples computing unit 102 to connection 104. Specifically, adapter 112 plugs into the input/output (I/O) slot of the computing unit and a cable connects the adapter to a plug on the switch connection. As an alternative, the adapter can plug into a memory bus of the computing unit.

Communication between adapters 112 associated with different computing units is, as noted, across packet switch network 104. One example of switch 104 is described in detail in "IBM Parallel System Support Programs for AIX Administration Guide," Publication Number GC23-3897-02 (1996), which is hereby incorporated herein by reference in its entirety. (The IBM Parallel System Support Programs is abbreviated as PSSP).

As further explanation, communication between a computing unit and its associated adapter 112 is, for instance, described by an interface that includes functions, such as, open communication, close communication, enable route, disable route, return status, set interrupt threshold, and reset adapter. In one embodiment, the adapter interface 112 is employed by a message passing library 110 which may, for example, implement the MPI Standard. As noted, an implementation of the MPI Standard that uses UNIX signals and signal handlers to respond to arriving message packets has been available in the industry and has received broad acceptance. In accordance with the principles of the present invention, a mechanism is provided outside of the MPI Standard by which threaded user tasks may acknowledge and take action responsive to asynchronous arrival at a threaded MPI of a message packet from another computing node of the system.

Access to an adapter is mediated by a kernel extension 108 of each computing unit 102. Extension 108 includes a set of functions that have the authority of the operating system itself (e.g., the AIX operating system offered by International Business Machines Corporation). The kernel extension authorizes use of adapter 112 by user task 106 (or a program) and has the capability of interrupting the user task (by sending a SIGIO signal) or of waking a thread associated with a user task, if desired. User task 106 communicates with adapter 112 through the MPI library 110. The MPI library is described in greater detail in, for example, an International Business Machines Publication entitled "IBM Parallel Environment for AIX: MPI Programming and Subroutine Reference," Version 2, Release 2 (November, 1996), the entirety of which is hereby incorporated herein by reference. This publication describes the conventional MPI library which comprises a signal handling library that manages message traffic. This signal handler MPI employs a number of industry standard functions. For example, a signal input/output (SIGIO) is generated when a message packet arrives at the library.

International Business Machines Corporation's implementation of the MPI library is described in detail in various additional publications. For example, reference an article in the IBM Systems Journal entitled "The Communication Software and Parallel Environment of the IBM SP2," Vol. 34, No. 2, pp. 205–215 (1995). Further information is available in a textbook by W. Richard Stevens entitled *UNIX Network Programming*, published by Prentice Hall, Inc. (1990). Both of these references are hereby incorporated herein by reference in their entirety.

As noted, it is assumed herein that the computing environment comprises a threaded computer environment so that the user task comprises one or more user threads, and the library is a threaded MPI. A threaded computer environment is today known in the industry as an alternate approach (i.e., to a signal handling approach) for implementing multi-node distributed processing. A threaded MPI library is available from International Business Machines Corporation as "IBM Parallel Environment for AIX," Version 2, Release 3, IBM product number 7565-543 (August 1997). This threaded MPI comprises a licensed program product which runs on the AIX system. The discussion which follows assumes use of this embodiment of the present invention.

As an overview of one embodiment of the present invention, since the threaded MPI library creates an interrupt service thread to handle a message packet arrival (either via a SIGIO signal or by a thread wake up), the desired capability of the invention can be supplied if the user task can specify a function to be called by the interrupt service thread upon asynchronous arrival of the message packet. Since SIGIO may be involved, and since SIGIO is the mechanism used by the "signal handler" library, the user specification can be in the form of a call to the AIX "sigaction" function to specify the user written function to be invoked. The "sigaction" function is described, for example, in an IBM AIX publication entitled: "Technical Reference, Volumes 1 & 2, Base Operating System & Extensions," Version 4, Fourth Edition, (October 1996), the entirety of which is hereby incorporated herein by reference.

By way of example, the following logic can be implemented when the MPI library is initialized.
If the user has registered a function for the SIGIO signal, then unregister it as a signal handler, saving the function pointer
else note that the user hasn't registered a function for SIGIO.
The interrupt service thread can interrupt a sigwait loop waiting for a SIGIO signal, or it can sleep in the kernel by calling et_wait, waiting for the kernel extension to wake it up. The sigwait function is described in the above-incorporated AIX material, while the et_wait function is described in an IBM AIX publication entitled "Technical Reference, Volume 5: Kernel and Subsystems," Version 4, 4th Edition (October 1996), which is hereby incorporated herein by reference in its entirety. After the service thread processes incoming packets, the interrupt service thread performs the following logic before waiting again:
If the saved function pointer is a legal function pointer, then call the function, passing SIGIO as the signal number.
else, skip the call.
As described further below, when the MPI library is terminated, the user's function is reassociated with the SIGIO signal via a sigaction call. Note that in accordance with the present invention, the user's program comprising the action to be taken upon arrival of the message packet does not have to be signal safe. One expected use of the present invention is that the user's code will execute thread calls to wake up other threads waiting on one or more events.

Figure 2:
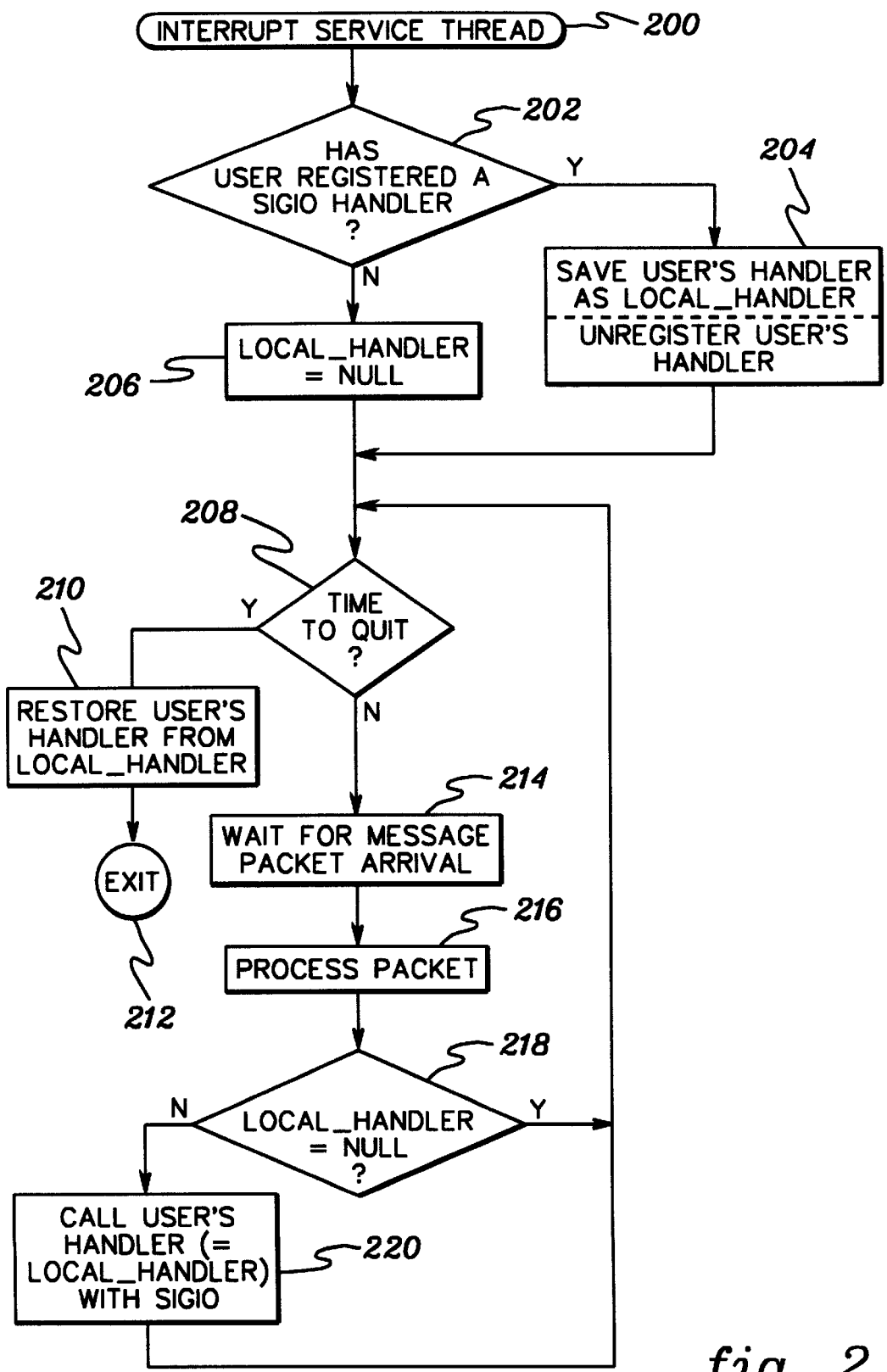
FIG. 2 is a flowchart of one embodiment of interrupt service thread processing in accordance with the present invention.

One embodiment of interrupt service thread 200 processing in accordance with the present invention is depicted in FIG. 2. The service thread is created by the MPI library function MPI_Init which is called by a user task wishing to do message passing. The initiate message passing interface function (i.e., MPI_Init) is described, for example, in an IBM publication entitled: "IBM Parallel Environment for AIX: MPI Programming and Subroutine Reference," Version 2, Release 3, Third Edition (August 1997), the entirety of which is hereby incorporated herein by reference.

Prior to calling the MPI_Init function to initiate an interrupt service thread, however, a user task predefines or pre-registers with the operating system a user-defined program (or signal handler) for the SIGIO signal, using standard UNIX calls such as the "signal" call, or the "sigaction" call in an AIX implementation. Once initialized, the service thread initially inquires whether such a user-defined program has been registered again using standard UNIX calls 202, and then copies the address of the user's program to local storage 204. Along with copying the address to local storage, the address of the user's program is unregistered at the user task. If no user-defined program has been registered as a SIGIO handler, then the local address ("local_handler") is set to null 206.

Upon entering the main process loop, processing determines whether the user task has been completed 208. If "yes", then the address of the user-defined program is restored from "local_handler" to the user task 210 and interrupt service processing is exited 212. Otherwise, processing waits for an event indicating arrival of a message packet 214. Waiting for an event can be implemented using different approaches. For example, a call to "sigwait" function (described in the above-incorporated IBM "Technical Reference, Volumes 1 & 2: Base Operating System & Extensions") could be made, which returns when a SIGIO signal is received by the process; or a call could be made to the UNIX kernel to sleep until the message passing device adapter (FIG. 1) generates a hardware interrupt due to a message packet arrival, and that interrupt causes the kernel extension to wake the sleeping thread.

Upon arrival of a message packet, the packet is processed 216 (e.g., by copying the packet into system storage, checking to see if the packet is a new packet and whether the packet has been received in sequence, and the source of the packet), and determination is made whether the user task has predefined a program at the local_handler register to be activated in response to arrival of the packet 218. Assuming that a program has been pre-registered, then the user-defined program is called with the processing of the packet 220. After the user-predefined action or if the local_handler is a null, meaning that the user task has not pre-registered a function to be implemented, processing returns to inquiry 208, and thereafter to wait for arrival of a next message packet assuming that the user task has not been completed.

The user-defined program can be called. with the argument=SIGIO using standard C programming constructs. For example:

/* if the user had a SIGIO handler, call it now */ if VALID_SIGHANDLER (saveaction_sigio) (*saveaction_sigio.sa_handler) (SIGIO)

In accordance with the principles of the present invention, the user's "signal handler" could comprise any user-defined program which accomplishes a desired action in response to the asynchronous arrival of a message packet at the receiver. By way of example, this predefined program could send a thread condition signal to another thread which, upon being awakened, may make an MPI call to receive the message packet knowing that the message has arrived. Note that this avoids the problem of the communication thread wasting CPU cycles while polling for a message that has not arrived. Again, however, the user-defined program could comprise any desired action based upon receipt of the message packet. Another example might include replying to the message packet by sending an acknowledgement to the message sender.

FIG. 3 depicts one example of the message passing capability of the present invention. In this example, three threads are shown, i.e., the main thread which is the initial thread associated with the user's task, an interrupt service thread as described above and a communication thread. The communication thread in this example would be activated by the present invention upon arrival of the message packet. The user's main program 330 at some point will call a sigaction (SIGIO, myprog) function 332 (in AIX), where "myprog" is the user-defined program. This sigaction call is followed by an MPI_Init call 334, which as described above, will create interrupt service thread 310. At some point after calling MPI_Init, the user task might also create, for example, a thread which runs a program called "myrecv" 336. The pthread_create function is an AIX function described in the above-incorporated technical reference materials. (In this example, myrecv comprises a communication thread 320.) Main thread 300 may also be performing certain computations 338 which may involve access to a work queue 340. Upon completion of the user task, main thread 300 will be exited 342.

The call to create the interrupt service thread executes the program steps of FIG. 2, in which the user's SIGIO handler is "myprog" 350 which may include, for example, multiple POSIX pthread calls, each of which is described in the above-incorporated technical reference material. Processing of the interrupt service thread 310 would be as depicted for thread 200 in FIG. 2 described above. Within this process, certain POSIX pthread calls are employed to implement instruction 220 of FIG. 2 as shown in FIG. 3. Specifically, when a packet arrives, a mutually exclusive lock 352 is performed, after which a condition signal 354 is generated. The thread condition signal is forwarded from the interrupt service thread to the communication thread 320, and in particular, to the pthread_cond_wait 364 of the communication thread. This thread signal essentially comprises a wake up signal which causes the communication thread to take action. After sending the thread signal, a pthread_mutex_unlock function is performed 356 before returning 358.

At another thread, the user-defined program "myrecv" 360 initially implements a pthread_mutex_lock function 362 and then enters a wait state for a thread condition signal 364 from the interrupt service thread. Once the thread signal is received, an MPI receive function 366 is performed to interpret the message packet data, and for example, add the message data to the work queue of the main thread 368. After processing the message packet, the communication thread returns to a wait state to await receipt of a next message packet.

The embodiment described above is only an example. For instance, the above described computer environment is presented by way of example only. A computing unit can include other types of units, nodes, computers, processors, systems, workstations and/or mainframes without departing from the spirit of the present invention. Additionally, each of the coupled units may be of the same type, of a different type or of any combination therebetween. Further, the computing units may be coupled to one another via various types of connections.

In the above example, each of the computing units is executing an AIX operating system offered by International Business Machines Corporation. However, this is also only one example. One or more of the computing units may execute any one of various operating systems. In yet another embodiment, the computer environment includes only one computing unit that executes the multiple tasks of an application, in accordance with the principles of the present invention.

The present invention can be included in an article manufacture (e.g., one or more computer program products) having, for instance, computer useable media. The media has embodied therein, for instance, computer readable program code means for providing and facilitating the capabilities of the present invention. The article of manufacture can be included as part of a computer system or sold separately.

The flow diagrams depicted herein are exemplary. There may be other variations to these diagrams or the steps (or operations described herein) without departing from the spirit of the invention. For instance, the steps may be performed in differing order, or steps may be added, deleted or modified. All of these variations are considered a part of the claimed invention.

Although preferred embodiments have been depicted and described in detail herein, it will be apparent to those skilled in the art that various modifications, additions, substitutions and the like can be made without departing from the spirit of the invention and these are therefore considered to be within the scope of the invention as defined in the following claims.

What is claimed is:

1. An article of manufacture comprising:
    at least one computer useable medium having computer readable program code means embodied therein for causing the processing of a message packet within a computer environment having a plurality of computing nodes interconnected for transmission of messages between threaded user tasks executing asynchronously in ones of the computing nodes, a message being transmitted as at least one message packet from a source computing node (sender), to a receiver computing node (receiver), said receiver having a threaded message passing interface (MPI), the computer readable program code means in said article of manufacture comprising:
    computer readable program code means for causing a computer to effect employing an interrupt service thread at the receiver to call a user-defined program in response to asynchronous arrival of the at least one message packet at the receiver; and computer readable program code means for causing a computer to effect employing the user-defined program to take a pre-defined action in response said asynchronous arrival of the at least one message packet at the receiver.

2. The article of manufacture of claim 1, wherein said computer readable program code means for causing a computer to employ the user-defined program comprises computer readable program code means for causing a computer to employ the user-defined program to initiate a receive function to receive the at least one message packet at the receiver's threaded MPI.

3. The article of manufacture of claim 2, wherein said computer readable program code means for causing a computer to employ the user-defined program to initiate said receive function comprises computer readable program code means for causing a computer to employ the user-defined program to initiate interpreting of the at least one message packet.

4. The article of manufacture of claim 3, wherein said receive function further comprises computer readable program code means for causing a computer to add data from said at least one message packet to a work queue associated with a threaded user task at said receiver.

5. The article of manufacture of claim 1, wherein said computer readable program code means for causing a computer to employ the interrupt service thread further comprises computer readable program code means for causing a computer to employ the interrupt service thread to awake a waiting thread at said receiver upon arrival of said at least one message packet.

6. The article of manufacture of claim 1, further comprising computer readable program code means for causing a computer to define said interrupt service thread at the receiver, prior to receipt of said at least one message packet, to call said user-defined program upon arrival of said at least one message packet at the receiver.

7. The article of manufacture of claim 6, wherein said computer readable program code means for causing a computer to define said interrupt service thread includes computer readable program code means for causing a computer to determine whether a user task running at said receiver has registered said user-defined program to be called upon receipt of said at least one message packet, and if so, then computer readable program code means for causing a computer to provide said interrupt service thread with an address for calling said user-defined program upon arrival of said at least one message packet at the receiver.

8. The article of manufacture of claim 6, wherein said computer readable program code means for causing a computer to define comprises computer readable program code means for causing a computer to save an address of the user-defined program of said user task at said threaded MPI upon MPI initialization, said address of said user-defined program being subsequently employed by said interrupt service thread to call said user-defined program.

9. The article of manufacture of claim 8, further comprising computer readable program code means for causing a computer to restore said address of said user-defined program from said threaded MPI to said user task upon completion of said user task at said receiver.

10. The article of manufacture of claim 1, further comprising computer readable program code means for causing a computer to place said interrupt service thread in a wait state, after taking said predefined action, until arrival of a next message packet at the receiver.

* * * * *